United States Patent [19]

Kobayashi

[11] Patent Number: 4,938,065
[45] Date of Patent: Jul. 3, 1990

[54] ACCELERATION DETECTING DEVICE
[75] Inventor: Toshihiro Kobayashi, Aichi, Japan
[73] Assignee: Aisin Seiki Kabushiki Kaisha, Aichi, Japan
[21] Appl. No.: 329,630
[22] Filed: Mar. 28, 1989
[30] Foreign Application Priority Data Mar. 28, 1988 [JP] Japan .................. 63-74157

[51] Int. Cl.$^5$ ............................ G01P 15/12
[52] U.S. Cl. .................... 73/517 R; 338/5
[58] Field of Search .......... 73/517 R, 862.66, DIG. 1; 338/2, 5

[56] References Cited

U.S. PATENT DOCUMENTS 2,392,293  1/1946  Ruge ........................ 338/2
4,809,552  3/1989  Johnson ................. 73/517 R
4,848,157  7/1989  Kobayashi ............. 73/517 R Primary Examiner—John Chapman
Attorney, Agent, or Firm—Sughrue, Mion, Zinn, Macpeak & Seas

[57] ABSTRACT

An acceleration detecting device includes an elastic flat plate, a supporting member for fixing both ends of the plate, a weight fixed to a substantial central portion of the plate and extended from the plate in vertical direction. Strain detecting devices are arranged in a horizontal plane adjacent the weight and stress indicating devices are provided for indicating an external force applied to the weight from the strains detected by the strain detecting devices.

1 Claim, 5 Drawing Sheets

ACCELERATION DETECTING DEVICE

BACKGROUND OF THE INVENTION

This invention relates generally to acceleration detecting devices, and more particularly to an acceleration detecting device which detects acceleration of external force in a predetermined direction independently from displacement of a weight.

A conventional acceleration detecting device detects acceleration by detecting displacement of a weight moved in response to acceleration or gravity. However, since the weight moves in response to acceleration in any direction, such an acceleration detecting device detects acceleration which includes acceleration in a predetermined direction and acceleration in other directions.

SUMMARY OF THE INVENTION

The present invention has basically solved the foregoing disadvantages in the prior art. Therefore, one of the objects of the present invention is to provide an acceleration detecting device for independently detecting acceleration in a predetermined direction with only a simple structure.

The acceleration detecting device according to the present invention is comprised of an elastic flat plate fixed at both ends thereof, a weight fixed to a substantial central portion of the elastic flat plate and extended from the elastic flat plate in a vertical direction, strain detecting means arranged in a horizontal plane adjacent the weight, and stress detecting means for detecting an external force being applied to the weight from the stress detected by the strain detecting means.

Various other objects, features and attendant advantages of the present invention will be more fully appreciated as the same becomes better understood from the following detailed description when considered in connection with accompanying drawings.

BRIEF DESCRIPTION OF THE DRAWINGS

FIG. 1b is a plan view of an elastic flat plate in the embodiment shown in FIG. 1a;

DETAILED DESCRIPTION OF THE INVENTION

Figure 2A:
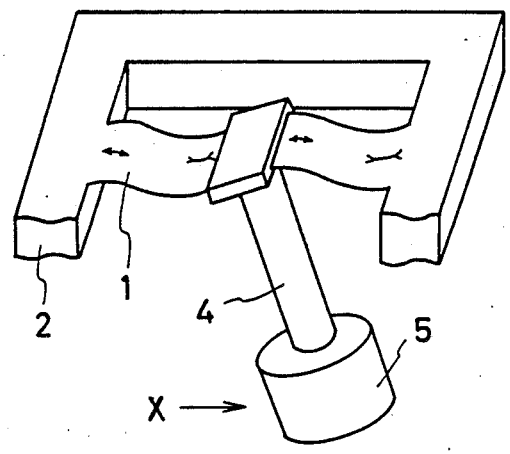
FIGS. 2a, 2b and 2c are perspective schematic views showing strains imparted to the elastic flat plate by accelerations in each direction.
Figure 2B:
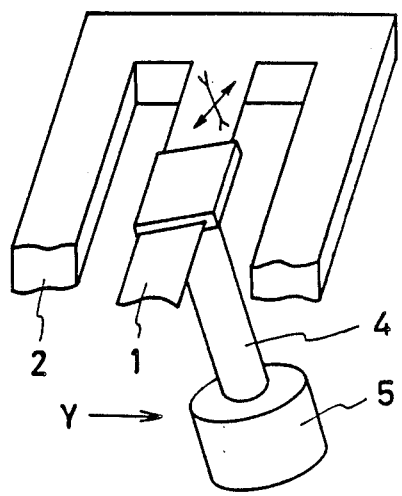
Figure 2C:
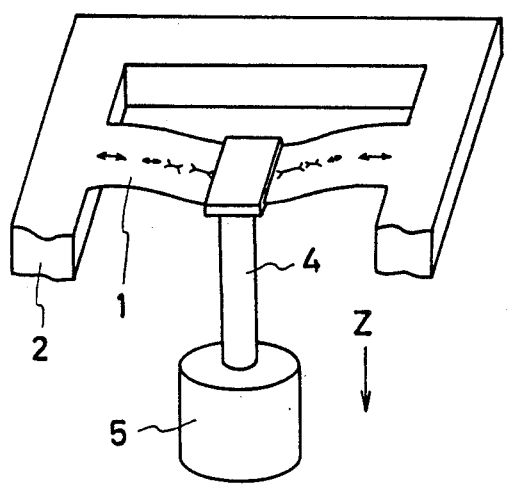

Referring to FIGS. 2a, 2b and 2c, an acceleration detecting device has a structure including an elastic flat plate 1 fixed at both ends thereof and an arm 4 having a weight 5 vertically fixed to the central portion of elastic flat plate 1. These Figures show stresses caused on elastic flat plate 1 when acceleration is in the longitudinal X direction of plate 1, acceleration is in the width direction Y of plate 1 and acceleration is in the vertical direction Z of plate 1. In FIGS. 2a, 2b and 2c, symbols "←" and "→" indicate a tensile stress and a compression stress, respectively.

Figure 3A:
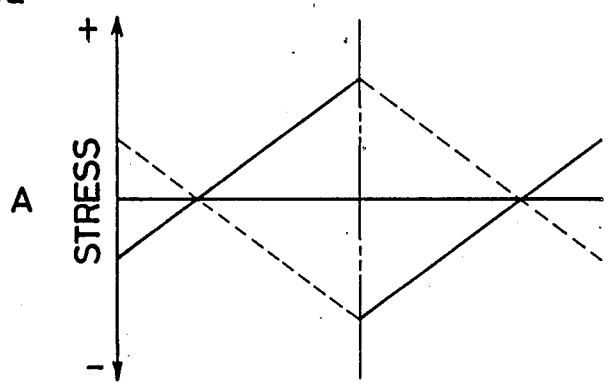
FIGS. 3a, 3b and 3c are graphs showing distributions of stress shown in FIGS. 2a, 2b and 2c.

According to FIG. 2a, by applying acceleration in the X direction a tensile stress is caused at one end of plate 1. The tensile stress decreases gradually as a compression stress is caused on one side of the arm mounting portion and the tensile stress is caused on the opposite side of arm mounting portion of plate 1. The tensile stress decreases gradually as a compression stress is caused at the other end of plate 1. The distribution of stress in the X direction as indicated in FIG. 2a is shown graphically in FIG. 3a.

Figure 3B:
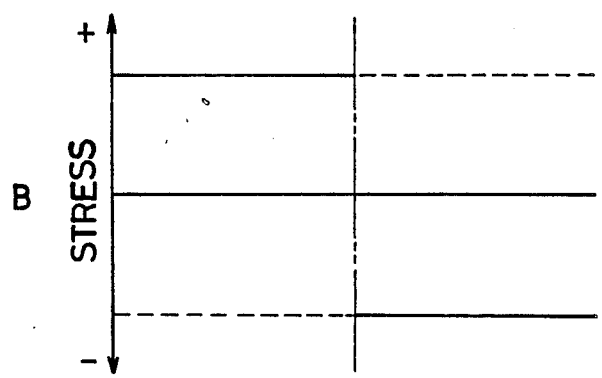

According to FIG. 2b, by applying acceleration in the Y direction, torsion is caused between one end of plate 1 and the arm mounting portion of plate 1 and operates as compression stress and tensile stress in each diagonal line of a rectangle which is formed between the end of plate 1 and the arm mounting portion of plate 1. A distribution of stress in the X direction as indicated in FIGS. 2b is shown graphically in FIG. 3b and compression stress is inverted to tensile stress on opposite sides of arm mounting portion of plate 1.

Figure 3C:
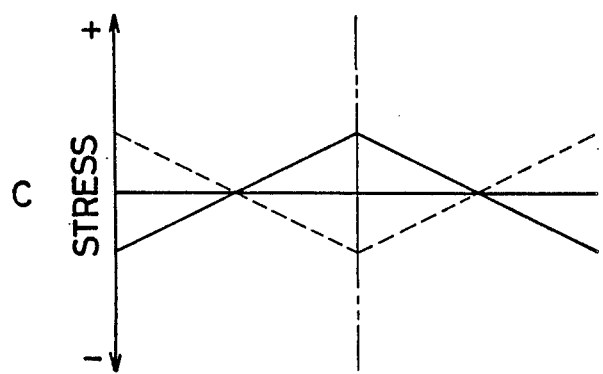

According to FIG. 2c, by applying acceleration in the Z direction tensile stress is caused at one end of plate 1. The tensile stress decreases gradually until compression stress is caused and the compression stress decreases gradually on the opposite side of the arm mounting portion of plate 1 until a tensile stress is caused at the other end of plate 1. A distribution of stress in the X direction as indicated in FIG. 2c is graphically shown in FIG. 3c.

Therefore it can be recognized that detecting acceleration in the X direction is accomplished by detecting strain in symmetrical positions on the arm mounting portion of plate 1. However such detection is strongly influenced by acceleration in the Y direction and also is influenced by acceleration in the Z direction due to the fact that it is impossible to detect strain at a point. Accordingly, as shown in FIG. 4a, if it is detected that strain caused at points a, b, c and d corresponding to each corner of a rectangle which is symmetrical to the arm mounting portion of plate 1, strains at points a and c are equal to strains at points b and d respectively when accelerations in the Y and/or Z directions are applied, whereby acceleration (strain) in only the X direction is detected by the difference between that difference between accelerations at points a and d and that difference between accelerations at points b and c.

Further it can be recognized that detecting acceleration in the Y direction is accomplished by detecting strain at a point taken along each diagonal line of a rectangle, having side legs extended in the X direction in parallel, such as a rectangle formed between one end of plate 1 and the arm mounting portion of plate 1. However, it also receives influence of acceleration in the X and/or Z directions due to the fact that it is impossible to detect strain at a point. Accordingly, as shown in FIG. 4b, if upon detecting strains caused at points e, f, g and h taken along each diagonal line of two symmetrical congruent rectangles on the arm mounting portion of plate 1, wherein the rectangles have side legs extended in the X direction, strains at points e and g are equal to those at points f and h respectively when acceleration in the X and/or Z directions are applied, acceleration (strain) in only the Y direction is detected by the difference between that difference between accelerations at points e and h and that difference between accelerations at points f and g.

Figure 4A:
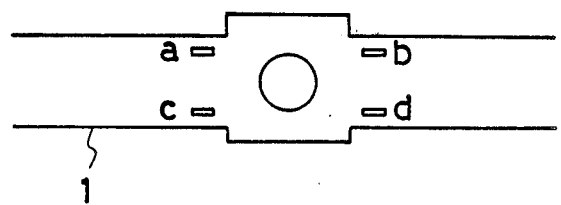
FIGS. 4a and 4b are partial plan views showing detector positions for detecting strains.
Figure 4B:
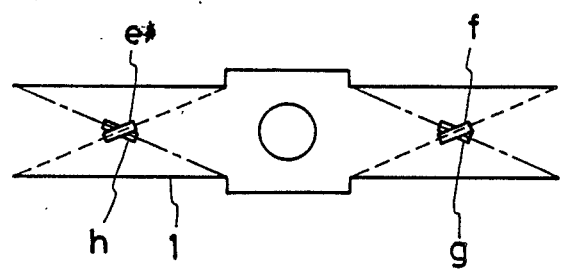

Thus, accelerations in the X and Y directions are able to be detected independently by detecting strains at the points a, b, c and d on plate 1 as shown in FIG. 4a and the points e, f, g and h on plate 1 as shown in FIG. 4b.

Figure 1A:
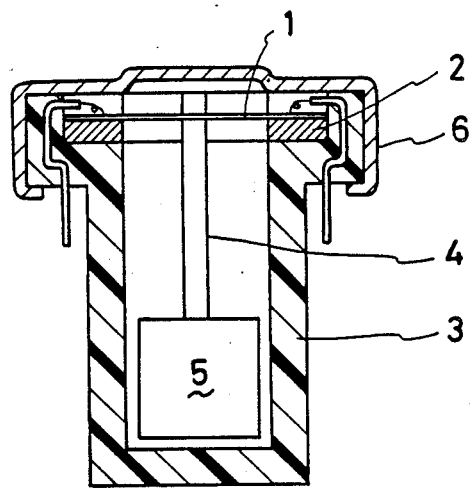
FIG. 1a is a cross sectional view of one embodiment of a two-direction acceleration detecting device according to the present invention.
Figure 1B:
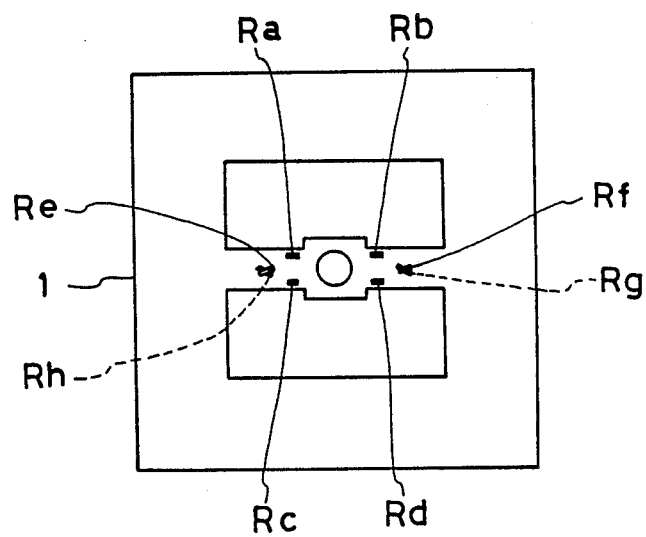

Referring to FIGS. 1a and 1b, a two-direction acceleration detecting device has an elastic flat plate 1 fixed to a frame 2 rigidly at circumferential portions thereof. The frame 2 is fixed to a casing 3. An arm 4 is fixed to a central portion of plate 1 at one end thereof. A weight 5 is fixed to the other end of arm 4. The arm 4 is able to tilt and is prevented from excess tilting by an inner wall portion of casing 3 which operates as a limit step. The interior of casing 3 is kept air-tight and filled with damping oil for damping movement of weight 5 caused by vibrations.

Both top and back surfaces of plate 1 are coated with electrical insulation. As shown in FIG. 1b, strain-resistance elements Ra, Rb, Rc and Rd are arranged in positions a, b, c and d corresponding to each corner of a symmetrical rectangle on the arm mounting portion of plate 1 as shown in FIG. 4a and strain-resistance elements Re, Rf, Rg and Rh are arranged in positions e, f, g and h on each diagonal line of two rectangles formed on the arm mounting portion of plate 1 as shown in FIG. 4b. One of the strain-resistance elements Re and Rf is arranged on one of the top and back surfaces of plate 1 and the other of strain-resistance elements Re and Rf is arranged on the other of the top and back surfaces of plate 1 so as to prevent overlapping each other. Also, one of the strain-resistance elements Rg and Rh is arranged on one of the top and back surfaces of plate 1 and the other of the strain-resistance elements Rg and Rh is arranged on the other of the top and back surfaces of plate 1 so as to prevent overlapping each other.

Figure 1C:
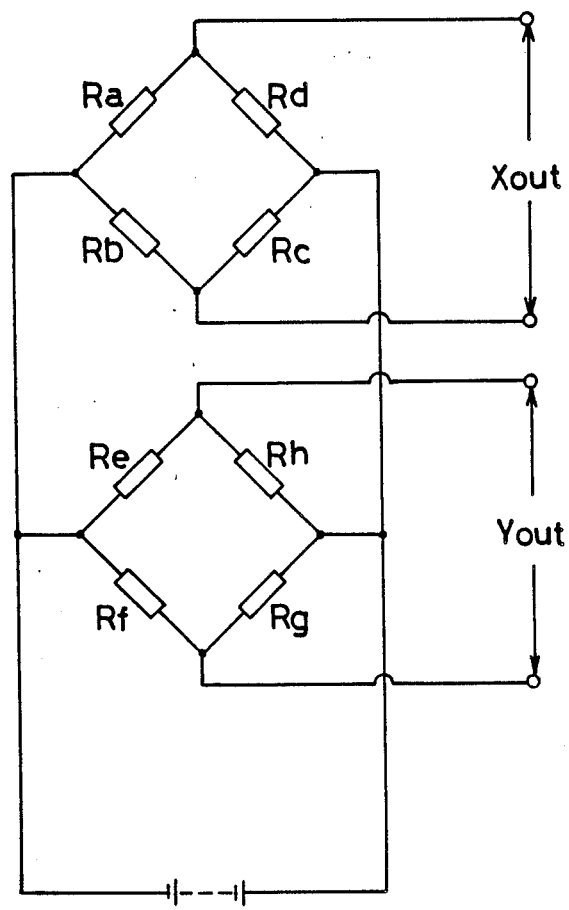
FIG. 1c is a block diagram showing an electric circuit for detecting strain imparted to the elastic flat plate.

Strain-resistance elements Ra, Rb, Rc, Rd, Re, Rf, Rg and Rh are electrically connected as shown in FIG. 1c and form bridge circuits 7 and 8.

In the bridge circuit formed by strain-resistance elements Ra, Rb, Rc and Rd, an output "Xout" corresponding to acceleration in the X direction is detected independently due to the balanced condition by which change in the resistance of strain-resistance elements Ra and Rc are equal to that of strain-resistance elements Rb and Rd respectively in respect to acceleration in the Y and/or Z directions.

In the bridge circuit formed by strain-resistance elements Re, Rf, Rg and Rh, an output "Yout" corresponding to acceleration in the Y direction is detected independently due to the balanced condition by which change in the resistance of strain-resistance elements Re and Rg are equal to that of strain-resistance elements Rf and Rh respectively in respect to acceleration in X and/or Z directions.

Figure 5:
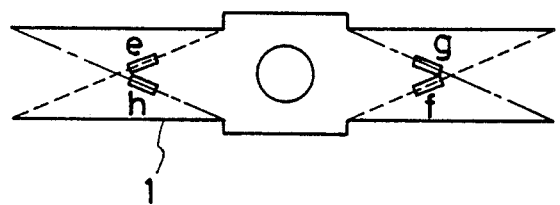
FIG. 5 is a partial plan views explaining another detector position for detecting strains.

If strain-resistance elements Re, Rf, Rg and Rh are arranged as shown in FIG. 5, strain-resistance elements Re, Rf, Rg and Rh can be arranged on a single surface of plate 1 whereby it can be assembled easily.

In this embodiment, strain-resistance elements Re, Rf, Rg and Rh are arranged on each diagonal line of two congruent rectangles formed between the arm mounting portion of plate 1 and the end of plate 1. However, the rectangles are also available if the rectangles are symmetrical on opposite sides of the arm mounting portion of plate 1 and are in parallel in the X direction.

Obviously, many modifications and variations of the present invention are possible in light of the above teachings. It is therefore to be understood that within the scope of the appended claims the invention may be practiced otherwise than as specifically described herein.

What is claimed is:

1. An acceleration detecting device comprising:
   an elastic flat plate;
   a supporting member secured to opposite ends of said plate;
   a weight fixed to a substantially central portion of said plate and extending downwardly from said plate in a vertical direction;
   strain detecting means arranged on said plate in a horizontal plane adjacent said weight; and
   stress indicating means for indicating an external force being applied to said weight from strains detected by said strain detecting means;
   wherein said strain detecting means is comprised of a plurality of pairs of strain detectors disposed in corners of a rectangle symmetrically disposed relative to said central portion of said plate and on each diagonal line of two congruent rectangles on opposite sides of said central portion having side legs in parallel in a direction connecting said both ends of said plate with said stress indicating means indicating an external force applied to said weight in length and width directions from a difference between strains detected by said strain detectors arranged in pairs.

* * * * *